United States Patent [19]

Aoki et al.

[11] Patent Number: 4,953,677
[45] Date of Patent: Sep. 4, 1990

[54] METHOD OF AND APPARATUS FOR CONTROLLING DIRECT COUPLING MECHANISM IN HYDRODYNAMIC DRIVING APPARATUS

[75] Inventors: Takashi Aoki, Saitama; Satoshi Terayama, Tokyo; Yoshihisa Iwaki; Hiroyuki Shimada, both of Saitama; Kimihiko Kikuchi, Tokyo; Hiroshi Nakayama, Saitama, all of Japan

[73] Assignee: Honda Giken Kogyo Kabushiki Kaisha, Tokyo, Japan

[21] Appl. No.: 330,221

[22] Filed: Mar. 29, 1989

[30] Foreign Application Priority Data

Mar. 30, 1988 [JP] Japan ................................ 63-77488
Mar. 30, 1988 [JP] Japan ................................ 63-77489

[51] Int. Cl.⁵ ........................................ F16H 45/02
[52] U.S. Cl. .................................... 192/3.3; 192/3.31
[58] Field of Search ................. 192/3.29, 3.3, 3.31

[56] References Cited

U.S. PATENT DOCUMENTS

| 4,579,208 | 4/1986 | Nishikawa et al. | 192/3.3 X |
| 4,618,037 | 10/1986 | Nishikawa et al. | 192/3.31 X |
| 4,660,697 | 4/1987 | Yoneda et al. | 192/0.076 X |
| 4,700,819 | 10/1987 | Nishikawa et al. | 192/3.31 X |

FOREIGN PATENT DOCUMENTS

| 0049160 | 3/1985 | Japan | 192/3.31 |
| 0143266 | 7/1985 | Japan | 192/3.31 |
| 61-286665 | 12/1986 | Japan . | |

OTHER PUBLICATIONS 1 page doucument (22 M 590); English summary of 61-286665 Japanese patent publication.

Primary Examiner—Rodney H. Bonck
Attorney, Agent, or Firm—Lyon & Lyon

[57] ABSTRACT

The amount of engagement of a direct couping mechanism such as lockup clutch (6) disposed between input and output members of a hydrodynamic driving apparatus such as a torque converter (5) to mechanically connect or disconnect the input and output members (5a, 5b) is controlled so as to bring a parameter indicative of the amount of slippage between the input and output members into a predetermined reference range. The average value of the parameter which is measured in a prescribed time interval is determined, and a control value for the amount of engagement in a next prescribed time interval is determined based on the differnece between the average value and the predetermined reference range value.

11 Claims, 10 Drawing Sheets

Fig. 13

| No. | RANGE | 1ST SOL. VALVE | 2ND SOL. VALVE | | TIMING VALVE |
|---|---|---|---|---|---|
| | | | F/B COMP. | E/T COMP. | |
| 1 | OFF RANGE | OFF | OFF | OFF | OFF |
| 2 | F/B RANGE | ON | FEEDBACK | CORRES. TO E/T | OFF |
| 3 | CONTROL RANGE | ON | LEARNED VALUE | CORRES. TO E/T | OFF |
| 4 | 1ST SEMITIGHT RANGE | ON | LEARNED/V + FIXED/V | CORRES. TO E/T | OFF |
| 5 | 2ND SEMITIGHT RANGE | ON | ON | ON | OFF |
| 6 | TIGHT RANGE | OFF | ON | ON | ON |

METHOD OF AND APPARATUS FOR CONTROLLING DIRECT COUPLING MECHANISM IN HYDRODYNAMIC DRIVING APPARATUS

BACKGROUND OF THE INVENTION

The present invention relates to a method of and an apparatus for controlling a direct coupling mechanism such as a lockup clutch or the like to mechanically connect and disconnect the input and output members of a hydrodynamic driving apparatus such as a torque converter or the like.

Conventional automatic transmissions for use in automobiles are generally in the form of a combination of a hydrodynamic driving apparatus such as a torque converter, for example, and a transmission gear shifting mechanism. The hydrodynamic driving apparatus suffers slippage during the transmission of engine power since the engine power is transmitted through a fluid in the hydrodynamic driving apparatus. The slippage thus caused results in poor fuel economy and an increase in the engine rotational speed which in turn produces greater engine sounds.

To avoid the above drawbacks, some transmissions employing such a hydrodynamic driving apparatus includes a direct coupling mechanism such as a lockup clutch, for example, for directly mechanically connecting the input and output members of the hydrodynamic driving apparatus (e.g. the impeller and turbine of a torque converter). The engine power is transmitted through the torque converter only while the automobile is running in a low speed range, or when gear shifts are effected, and the lockup clutch is engaged for improved fuel economy and reduced engine sounds in other occasions.

The lockup clutch may be controlled such that it is simply engaged or disengaged, or it is selectively engaged, partly engaged, and disengaged. The latter control is effected in a certain driving mode in low- and medium-speed ranges. According to this control process, the torque converter is not completely directly connected, but the lockup clutch or direct coupling mechanism is controlled to cause slippage when the torque varies at a peak value. For example, the ratio e of the rotational speeds of the input and output members of the torque converter, or a slip ratio (1-e), is calculated, and fed back for controlling the direct coupling mechanism so that the speed ratio e will not become 1 or the slip ratio will not become 0 in the aforesaid certain driving mode. Such a control method is disclosed in Japanese Laid-Open Patent Publication No. 61-286665, for example.

With the lockup clutch being thus variably engageable under the feedback control, however, a system for controlling the amount of engagement of the lockup clutch is inevitably subject to a certain delay in operation. In addition, the control process is adversely affected by the detecting errors of sensors which detect the rotational speeds of the input and output members of the torque converter or an error produced in calculating the speed ratio or slip ratio. For these reasons, the amount of engagement of the lockup clutch may be excessively or insufficiently corrected, and hence the lockup clutch may not stably controlled, with the results that the rotational speed of the input or output member of the torque converter tends to surge or vary.

In order to solve the above problems caused by the error in detecting the rotational speeds or the error in calculating the speed ratio or the slip ratio, the applicant has proposed a control method by which a control value for the amount of engagement of a lockup clutch is maintained at a constant level for a predetermined period of time, and a control value for a next period of time is determined based on the ratio e of the rotational speeds of the input and output members of a torque converter at the end of the predetermined period of time.

According to the proposed control method, the amount of engagement of the lockup clutch can be stably controlled to suppress any surging or variation of the rotational speed of the output member of the torque converter. If the control method is carried out while the automobile is being accelerated, for example, the speed ratio e increases even when a control value for the amount of engagement of the lockup clutch is constant. Therefore, where the speed ratio e is detected at the end of a predetermined period of time and a control value for a next period of time is determined based on the detected speed ratio e on a real-time basis, the amount of clutch engagement is overly corrected, lowering the engine rotational speed. As a result, the automobile runs in an embarrassing situation in which it is accelerated while the engine rotational speed is being lowered.

The direct coupling mechanism or lockup clutch is controlled by employing two control hydraulic pressures, i.e., a modulated pressure supplied by turning on and off two solenoid valves, and a throttle pressure commensurate with the opening of the throttle valve of the engine. These control hydraulic pressures are used to control the operation of a lockup shift valve, a lockup control valve, and a lockup timing valve for engaging and disengaging the lockup clutch. The throttle pressures is also employed to control hydraulic clutches for effecting gear shifts. Since the throttle hydraulic pressure fluctuates when a gear shift is made, therefore, the control of the lockup clutch is liable to become unstable.

SUMMARY OF THE INVENTION

It is an object of the present invention to provide a method of controlling a direct coupling mechanism to prevent an automobile from running in an embarrassing fashion, to stably control the amount of engagement of the direct coupling mechanism, and to suppress surging or variations of the rotational speed of the output member of a torque converter.

Another object of the present invention is to provide an apparatus for effectively controlling the foregoing direct coupling mechanism.

Still another object of the present invention is to provide an apparatus for controlling the amount of engagement of a direct coupling mechanism without employing a throttle pressure as a control hydraulic pressure.

According to a control method of the present invention, the amount of engagement of a direct coupling mechanism disposed between input and output members of a hydrodynamic driving apparatus to mechanically connect and disconnect the input and output members is controlled so as to bring a parameter indicative of the amount of slippage between the input and output members into a predetermined reference range. The average of values of the parameter which are measured in a prescribed time interval is determined, and a control value for the amount of engagement in a next prescribed time interval is determined based on the difference between the average and the predetermined reference range.

With the control method of the invention, the control value for the amount of engagement of the direct coupling mechanism is established dependent on the difference between the previous average of the values of the parameter and the predetermined reference range, and the established control value is kept as it is in the present time interval. Since the control value remains at a constant level during the prescribed time interval, the rotational speeds of the input and output members of a torque converter are prevented from being surged or varied. As feedback control is effected based on the average of the parameters in the prescribed time interval, the automobile is prevented from running in an embarrassing situation in which it would be accelerated while the engine rotational speed is being lowered.

The control apparatus of the present invention employs, as control oil pressures, the constant oil pressure supplied dependent on the turning on and off of the first solenoid valve and the duty-ratio-controlled oil pressure supplied dependent on the duty ratio control of the second solenoid valve, for controlling the operation of the lockup shift valve, the lockup control valve, and the lockup timing valve. The lockup clutch is operable selectively into a disengaged condition in which the lockup clutch is disengaged by supplying a prescribed oil pressure to a release passage thereof, a lockup control condition in which the lockup clutch is partly engaged by supplying the release passage with a control oil pressure lower than the prescribed oil pressure and corresponding to the duty-ratio-controlled oil pressure, and an engaged condition in which the lockup clutch is fully engaged by cutting off the supply of the oil pressure to the release passage.

Further scope of applicability of the present invention will become apparent from the detailed description given hereinafter. However, it should be understood that the detailed description and specific examples, while indicating a preferred embodiment of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention and wherein:

FIG. 13 is a table of solenoid valve control variables for respective ranges.

DESCRIPTION OF THE PREFERRED EMBODIMENT

Figure 1:
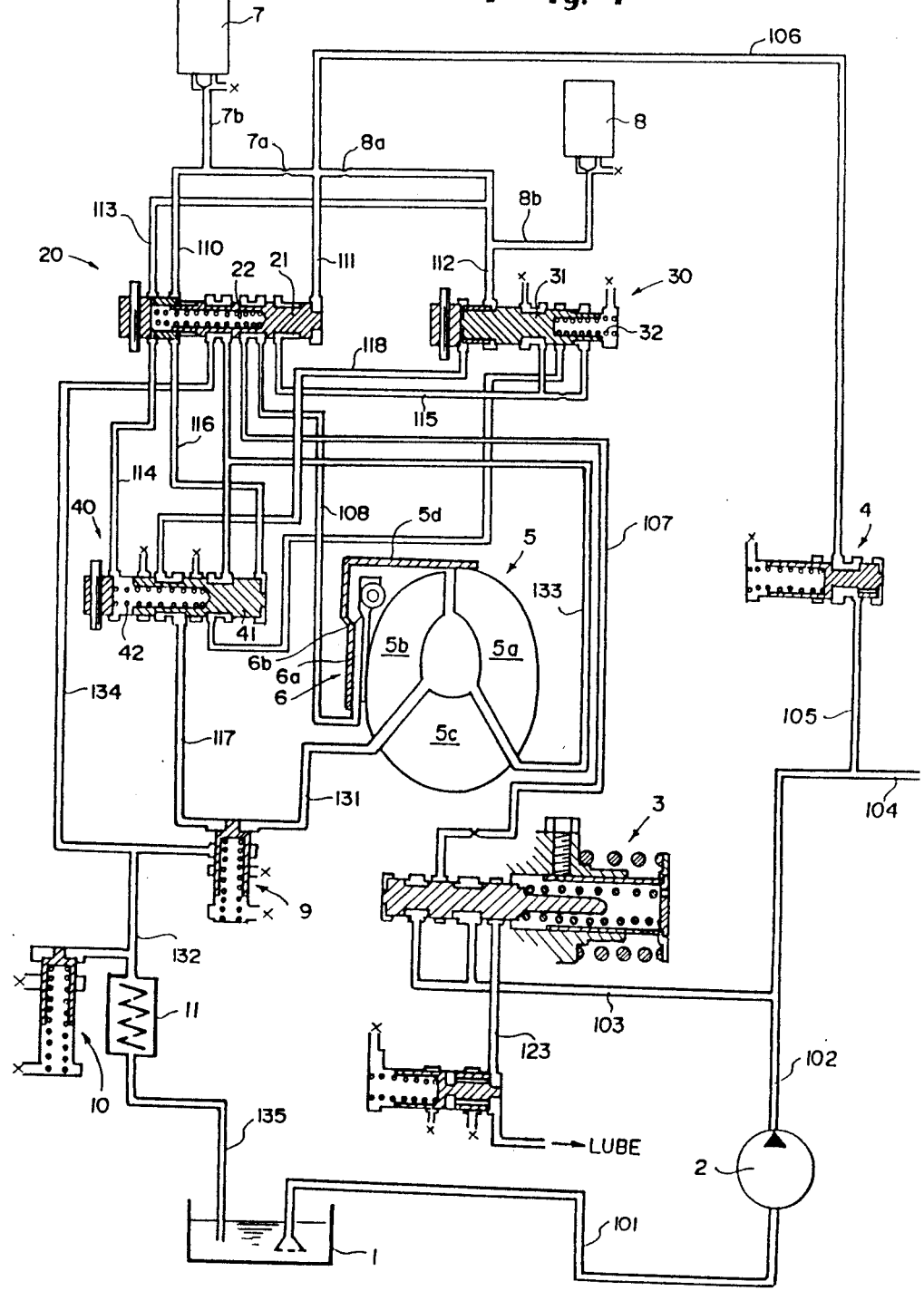
FIG. 1 is a circuit diagram of a hydraulic circuit associated with a torque converter having control valves.

FIG. 1 shows a hydraulic circuit associated with a torque converter 5 and having an apparatus for controlling a lockup clutch or direct coupling mechanism according to the present invention. The torque converter 5 has a lockup clutch 6 for directly connecting an impeller 5a and a turbine 5b of the torque converter 5. Operation of the lockup clutch 6 is controlled by a lockup shift valve 20, a lockup control valve 30, and a lockup timing valve 40 which are operated dependent on on-/off operation of a first solenoid valve 7 and duty-ratio operation of a second solenoid valve 8.

The lockup clutch 6 is operated according to driving conditions of an automobile on which the torque converter 5 is mounted, for increased drivability and fuel economy. The amount of engagement of the lockup clutch 6 is controlled by the valves 20, 30, 40 so as to be selectively in a lockup off range, a lockup control range, a full lockup range (tight condition), and a decelerating lockup control range. The lockup control range comprises a feedback range, a control range, a first semitight range, and a second semitight range, as described later on.

Oil is sucked by an oil pump 2 from an oil sump 1 through an oil passage 101 into an oil passage 102. The pressure of the oil thus supplied to the oil passage 102 is then regulated into a line pressure by a regulator valve 3 connected to the oil passage 102 by a branch oil passage 103. The line-pressure oil is supplied through an oil passage 104 to clutches for effecting gear shifts. An oil passage 105 is branched from the oil passage 104 and connected to a modulator valve 4 by which the line pressure from the oil passage 105 is regulated into a modulated pressure that is supplied to an oil passage 106.

When the first and second solenoid valves 7, 8 are turned off or closed, oil passages 7b, 8b connected to the oil passage 106 through respective orifices 7a, 8a are closed by respective spools of the solenoid valves 7, 8. The modulated pressure acts in oil passages 110, 111, 112, 113. Therefore, the modulated pressure is applied to the opposite ends of the lockup shift valve 20 through the oil passages 110, 113 and 111, moving a spool 21 of the lockup shift valve 20 to the right (FIG. 1) under the difference between the applied pressures and the bias of a spring 22. The modulated pressure is also applied to the lefthand end of the lockup control valve 30, moving a spool 31 thereof to the right. The modulated pressure is further imposed on the opposite ends of the lockup timing valve 40 through the oil passage 113 and an oil passage 114, and the oil passage 110 and an oil passage 116, whereupon a spool 41 of the lockup timing valve 40 is moved to the right under the bias of a spring 42.

At this time, the line pressure supplied from the regulator valve 3 to an oil passage 107 is supplied to an oil passage 108 through a groove in the spool 21 of the lockup shift valve 20, and then supplied from the oil passage 108 into a release passage 6a in the lockup clutch 6. Therefore, a clutch plate 6b connected to the turbine 5b is released from a case 5d connected to the impeller 5a, thus turning off or disengaging the lockup clutch 6.

The oil discharged from the torque converter 5 to an oil passage 131 flows through a torque converter relief valve 9 into a cooler oil passage 132. The oil discharged from the torque converter 5 to an oil passage 133 flows through a groove in the spool 21 and an oil passage 134 into the cooler oil passage 132. The oil then flows from the cooler oil passage 132 through an oil cooler 11 by which the oil is cooled. The cooled oil returns through an oil passage 135 into the oil sump 1. In order to protect the cooler oil passage 132 and the cooler 11, a cooler relief valve 10 is connected to the cooler oil passage 132 for releasing excessive oil pressure.

A lockup control mode of operation will be described below. In the lockup control mode, the amount of engagement of the lockup clutch 6 is controlled dependent on an increase in vehicle speed and engine output power by turning on or opening the first solenoid valve 7 and controlling the duty ratio of the second solenoid valve 8. When the first solenoid valve 7 is turned on, the modulated pressure in the oil passage 110 which has acted on the lefthand end of the lockup shift valve 20 is released, thus reducing the force tending to move the spool 21 rightward while it is still moved to the right. Since the oil passage 110 communicates with the oil passage 116, no oil pressure acts on the righthand end of the lockup timing valve 40, which remains moved to the right because it has already been moved to the right.

When the duty ratio of the second solenoid valve 8 is controlled, the oil pressure in the oil passages 112, 113 is controlled according to the controlled duty ratio so as to be lower than the modulated pressure in the oil passage 106. The duty-ratio-controlled oil pressure is lowered as the ratio of an on-duty signal is increased. As the vehicle speed increased, the ratio of the on-duty signal is increased, and the oil pressure which has been applied from the oil passage 113 to the lefthand end of the lockup shift valve 20 decreases, and the spool 21 of the lockup shift valve 20 is moved to the left by the modulated pressure acting on the righthand end of the spool 21 from the oil passages 106, 111. When the spool 21 is moved to the left, the line pressure supplied from the oil passage 106 is supplied to the oil passage 133, from which the line pressure is supplied into the torque converter 5 to increase the internal pressure of the torque converter 5. The clutch plate 6b of the lockup clutch 6 is therefore pressed toward the engaging position, i.e., toward a side of the case 5d, with a back pressure (reaction pressure) developed in the release passage 6a.

The internal pressure of the torque converter 5 acts in a direction to engage the clutch plate 6b with the case 5d, and the back pressure acts in a direction to disengage the clutch plate 6 from the case 5d. The release passage 6a in which the back pressure is developed is connected to the lockup control valve 30 through a groove in the spool 21 of the lockup shift valve 20 and the oil passage 115. Therefore, the spool 31 of the lockup control valve 30 is pushed to the left under the back pressure from the torque converter 65. The duty-ratio-controlled oil pressure from the solenoid valve 8 is applied to the lefthand end of the spool 31 through the oil passage 112. As the ratio of the on-duty signal is increased, the duty-ratio-controlled oil pressure is lowered, and hence the force tending to move the spool 31 to the right under the duty-ratio-controlled oil pressure varies dependent on the duty ratio of the solenoid valve 8. The lefthand end of the spool 31 is also subjected to the internal pressure of the torque converter 5 through the oil passages 117, 118, thus the spool 31 being pushed to the right. Accordingly, the back pressure of the torque converter 5 and the bias of the spring 32 are applied to the righthand end of the spool 31, whereas the duty-ratio-controlled oil pressure and the internal pressure of the torque converter 5 are applied to the lefthand end of the spool 31. The back pressure of the torque converter 5 varies dependent on the duty-ratio-controlled oil pressure. By varying the duty-ratio controlled oil pressure, the back pressure of the torque converter 5 can be controlled to control the amount of engagement of the lockup clutch 6.

The lockup control mode is effected as described above. When the ratio of the on-duty signal for the second solenoid valve 8 reaches 100% (i.e., the second solenoid valve 8 is turned on), and then the first solenoid valve 7 is turned off, a full lockup mode is effected. When the first solenoid valve 7 is turned off, the modulated pressure is applied to the righthand end of the lockup timing valve 40 from the oil passages 110, 116. Since the second solenoid valve 8 is on at this time, no oil pressure is present in the oil passages 113, 114, allowing the spool 41 of the timing valve 40 to move to the left. Therefore, the oil passage 118 is connected to drain, and the spool 31 of the lockup control valve 30 is held in the leftmost position. The release passage 6a of the torque converter 5 is connected to drain through the oil passages 108, 115, thus eliminating the back pressure of the torque converter 5. The lockup clutch 6 is fully engaged.

As described above, the amount of engagement of the lockup clutch 6 can be controlled by turning on and off the first solenoid valve 7 and controlling the duty ratio of the second solenoid valve 8. Specific driving conditions while the amount of engagement of the lockup clutch 6 is being controlled will be described below with reference to the graph of FIG. 2.

Figure 2:
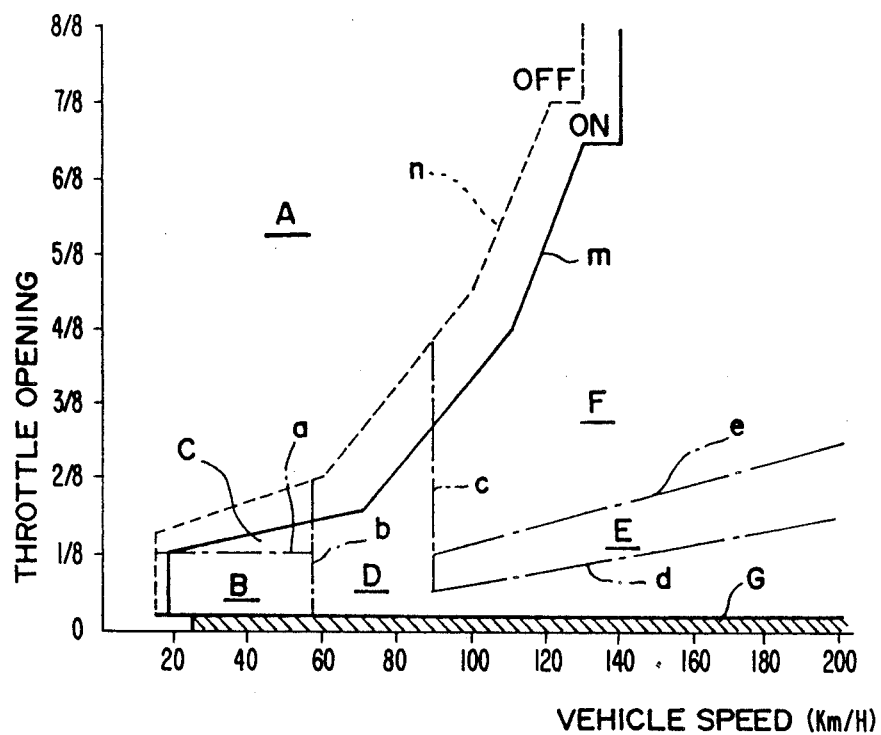
FIG. 2 is a graph showing a range of engagement of a lockup clutch as determined according to the relationship between throttle valve openings and vehicle speeds.

The graph of FIG. 2 has a vertical axis representing throttle valve openings and a horizontal axis representing vehicle speeds. The figure shows two ranges divided from each other by a lockup-on line m (indicated by the solid line). The range on the lefthand side of the lockup-on line m is an off range A. When the driving condition determined by the throttle valve opening and the vehicle speed is in the off range A, the lockup clutch 6 is controlled to be turned off or disengaged. When the driving condition is shifted from the off range A across the lockup-on line m into a lockup range on the righthand side of the lockup-on line m, the lockup clutch 6 is controlled to be engaged. A lockup-off line n is present on a lower-vehicle-speed side of the lockup-on line m with a certain range of hysteresis therebetween. After the driving condition has entered the lockup range, the lockup clutch 6 is turned off when the driving condition goes across the lockup-off line n entering the off range A.

The lockup range is divided by five lines a through e indicated by the dot-and-dash lines in FIG. 2 into five ranges, i.e., a feedback range B, a control range C, a first semitight range D, a second semitight range E, and a tight range F. There is also a decelerating lockup range G in which the throttle valve opening is substantially zero and the vehicle speed is higher than a predetermined speed (about 25 km/h).

Figure 3:
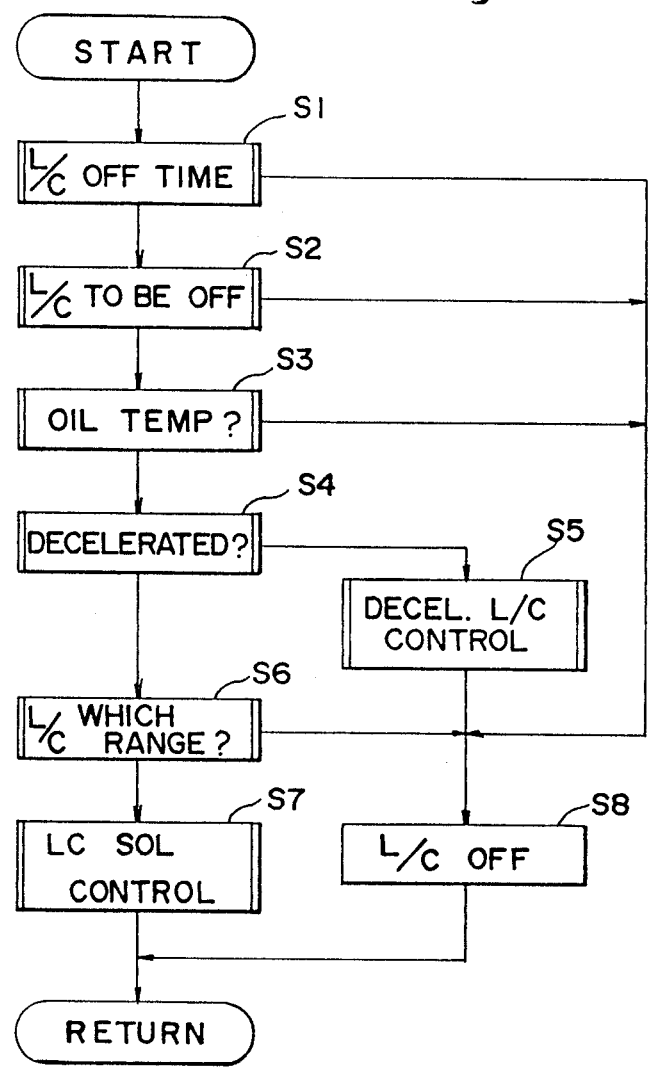
FIG. 3 through 6 and 8 through 11 are flowcharts of sequences for controlling solenoid valves to control the operation of the lockup clutch.

The amount of engagement of the lockup clutch 6 is controlled according to the above ranges. The sequence of controlling the lockup clutch 6 will be described below with reference to the flowchart of FIG. 3.

First, a step S1 determines a period of time during which the lockup clutch 6 is to be turned off. More specifically, when a gear shift is effected manually by operating a shift lever or a normal/power mode selector switch, the lockup clutch 6 is turned off for a certain period of time. Then, a step S2 determines whether the lockup clutch 6 is to be turned off during an automatic gear shift. When an automatic gear shift is to be effected, it is detected whether the gear shift is an upshift or downshift, and also the throttle valve opening is determined. Based on the detected data, the step S2 determines whether the lockup clutch 6 is to be turned off or not. Thereafter, control goes to a step S3 which determines whether the lockup clutch 6 is to be turned off because the oil in the torque converter 5 is extremely low or high in temperature. If the lockup clutch 6 is to be turned off in each of the above steps, then the lockup clutch 6 is turned off or disengaged in a step S8.

After the step S3, control proceeds to a step S4 to determine whether the automobile is being decelerated or not based on how the vehicle speed or the throttle valve opening varies. If the automobile is being decelerated, then a step S5 determines whether a decelerating lockup control mode is to be effected based on the oil temperature, the vehicle speed, and the engine rotational speed. If necessary, control goes to the step S8 to turn off the lockup clutch 6.

If it is determined that the automobile is not being decelerated in the step S4, then a step S6 determines which range in the map of FIG. 2 the driving condition is in. The operation of the first and second solenoid valves 7, 8 is then controlled dependent on the determined range in a step S7.

Control operation in the step S7 will be described in detail with reference to FIG. 4.

Figure 4:
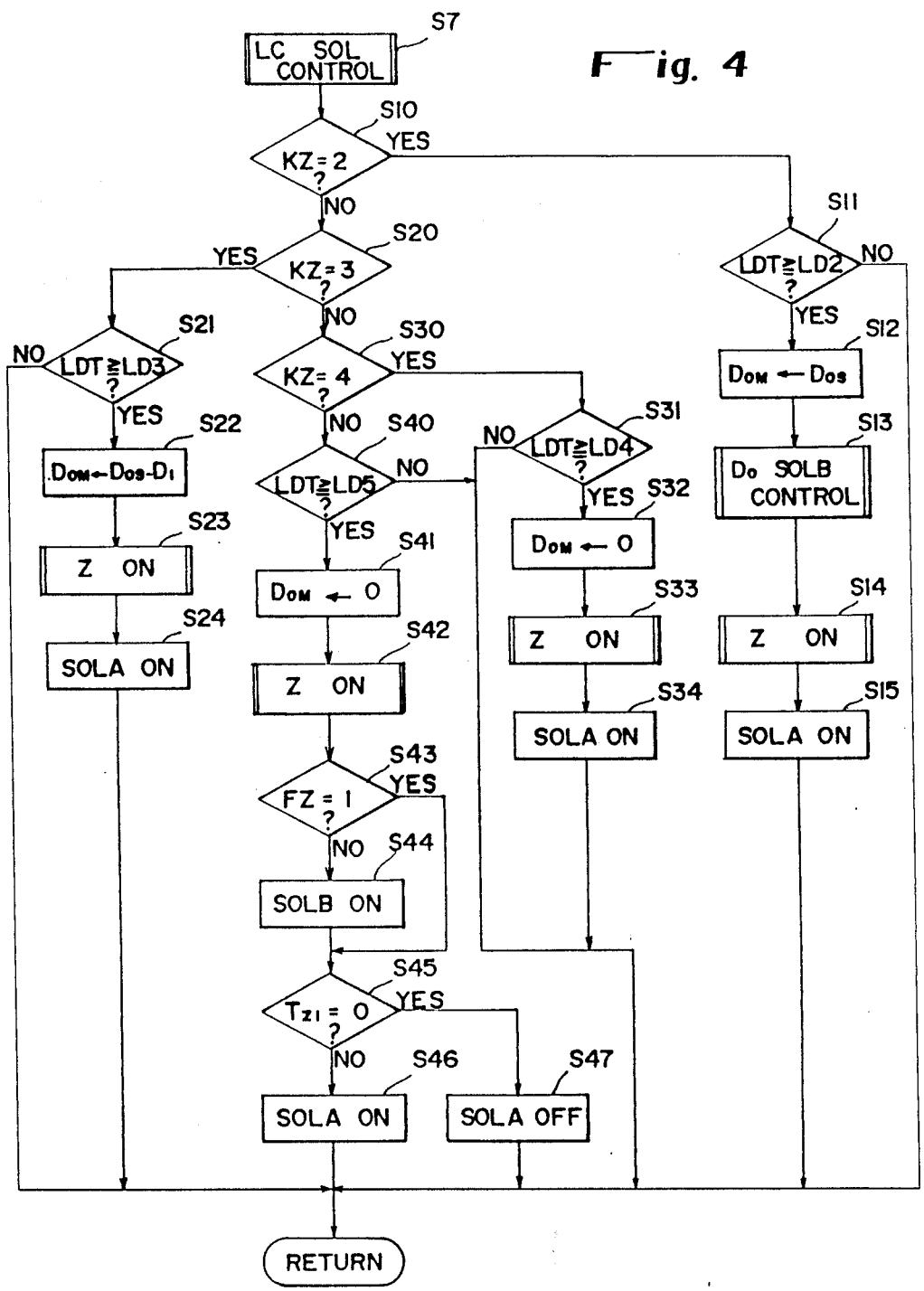

The control sequence shown in FIG. 4 determines which range the driving condition is in from a lockup zone code KZ in steps S10 through S30. The lockup zone codes KZ are numerals allotted to the respective ranges in the decision step S6 shown in FIG. 3. KZ=0 for the off range A, KZ=1 for the decelerating lockup range G, KZ=2 for the feedback range B and the control range C, KZ=3 for the first semitight range D, KZ=4 for the second semitight range E, and KZ=5 for the tight range F. Control goes to the step S6 only when the driving condition is in the lockup range and KZ=2, 3, 4, or 5.

If KZ=2 in a step S10, then the driving condition is in the feedback range B or the control range C, and control proceeds to a step S11. The step S11 determines whether a prescribed period of time LD2 has elapsed from the time when the driving condition has shifted from the off range into the range B or C. This is to engage the lockup clutch with a certain time delay when the driving condition is shifted from the off range A into the lockup range. Until the value of a delay timer LDT becomes larger than the delay time LD2, the control flow goes to the return step.

If LDT ≧ =LD2, then a learned value $D_{OS}$ (described later on) is stored as an off duty ratio $D_{OM}$ in a step S12, and a feedback component for controlling the duty ratio of the second solenoid valve 8 is determined in a step S13. The step S13 will be described later on. In a next step S14, $Z_{ON}$ control is effected to lessen an abrupt change in the duty ratio due to a shift between the ranges to prevent a shock which would otherwise result from the abrupt change in the duty ratio. Since the first solenoid valve 7 is required to be turned on for the control in the feedback range B or the control range C, a command is issued to turn on the first solenoid valve 7 in a step S15, after which the control flow goes to the return step.

If KZ=3 in the step S20, the driving condition is in the first semitight range D, and control goes to a step S21. Until the delay timer LDT becomes larger than a predetermined delay time LD3 after the driving condition entered the range D, control does not go to a step S22. In the step S22, a value produced by subtracting a fixed value D1 from the latest learned value $D_{OS}$ is stored as the off duty ratio $D_{OM}$. The learned value $D_{OS}$ is indicative of an off duty ratio. By subtracting the fixed value D1 from the learned value $D_{OS}$, the on duty ratio is increased, so that in the first semitight range, the off duty ratio $D_{OM}$ is set to a value for achieving an amount of engagement of the lockup clutch which is a fixed amount larger than the amount of engagement thereof based on the learned value $D_{OS}$. In order to prevent a shock from being produced by the abruptly changed duty ratio, $Z_{ON}$ control is effected in a step S23 to change the duty ratio smoothly. In the first semitight range D, it is necessary to turn on the first solenoid valve 7, and hence a command is issued to turn on the first solenoid valve 7 in a step S24, after which the flow goes to the return step.

If KZ=4 in the step S30, the driving condition is in the second semitight range E, and control goes to a step S31. Until the delay timer LDT becomes larger than a prescribed delay time LD4 after the driving condition entered the range E, control does not go to a step S32. In the step S32, the value of the off duty ratio $D_{OM}$ is set to 0. Then, $Z_{ON}$ control is effected in a step S33, and a command is issued to turn on the first solenoid valve 7 in a step S34, after which the flow goes to the return step.

If KZ is not equal to 4 in the step S30, then KZ=5 and the driving condition is in the tight range (full lockup range) F. Control goes to a step S40. Until the delay timer LDT becomes larger than a prescribed delay time LD5 after the driving condition entered the range F, control does not go to a step S41. In the step S41, the value of the off duty ratio $D_{OM}$ is set to 0. Then, $Z_{ON}$ control is effected in a step S42.

Control proceeds to a step S43 which determines a $Z_{ON}$ execution flag FZ is 1 or not. The $Z_{ON}$ execution flag is set to 1 while the duty ratio is being corrected under the $Z_{ON}$ control. After the flag FZ becomes 0, i.e., after the duty ratio correction is finished, control goes to a step S44 in which a command is issued to turn on the second solenoid valve 8.

Thereafter, a step S45 determines the value of a solenoid on timer $T_{Z1}$ has become 0 or not. Until it has become 0, the first solenoid valve 7 remains on in a step S46. When the value of the timer $T_{Z1}$ become 0, a command is issued to turn off the first solenoid valve 7 in a step S47. Stated otherwise, the tight condition (full lockup condition) is achieved by switching the first solenoid valve 7 from the turned-on condition to the turned-off condition. Such switching of the first solenoid valve 7 is effected after having waited for a certain period of time.

Figure 5:
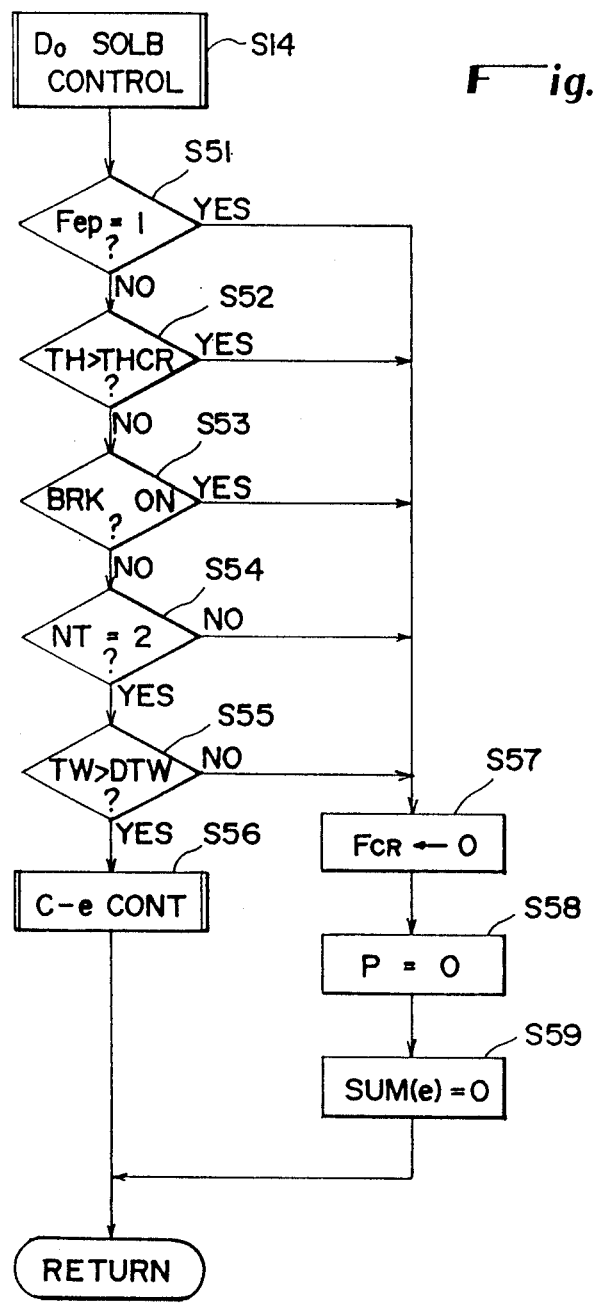

The controlling operation in the feedback region B and the control region C effected in the step S13 will be described in detail with reference to FIG. 5.

In the control operation, decision steps S51 through S55 are first executed. A step S51 determines whether a feedback inhibit flag Fep is set to 1 or not. If it is set to 1, then control goes to a step S57.

A step S52 determines whether a throttle valve opening TH is larger than a cruise decision throttle valve opening THCR. The cruise decision throttle valve opening THCR is the same as the throttle valve opening indicated by the dot-and-dash line a by which the feedback range B and the control range C are divided from each other. The condition TH>THCR means that the driving condition is in the control range C. In this case, control goes to a step S57.

The step S53 determines whether the brake is applied or not. If the brake is in operation, control goes to the step S57.

A step S54 determines whether a temperature range code NT is 2 or not. If NT=2, then control goes to the step S57. The temperature range code NT can have one of five values at a time, ranging from 0 to 4 dependent on the temperature of the oil in the torque converter. The ranges 0 through 4 of the temperature range code NT indicate a very low temperature, a low temperature, a normal temperature, a high temperature, and a very high temperature, respectively. If the temperature is very low or very high (NT=0 and 4), the lockup clutch is off in the step S3 of FIG. 3. Therefore, the flow of FIG. 5 is executed only when NT=1 through 3. If NT=2 (normal temperature), control goes to a step S55, and if NT=1 or 3 (low or high temperature), control goes to the step S57.

The step S55 determines whether an engine coolant temperature TW is higher than a feedback control permission temperature DTW or not. If lower than the feedback control permission temperature DTW, then control proceeds to the step S57, and if higher than the feedback control permission temperature DTW, then control goes to a step S56.

In the step S57, a correction permission flag $F_{CR}$ is set to 0. Then, a sampling counter value P is set to 0 and a speed ratio integral SUM(e) is set to 0 in respective steps S58, S59. As can be understood from the decision step S52, control proceeds to the step S57 when the driving condition is in the control range. In this case, the latest learned value $D_{OS}$ stored in the step S12 shown in FIG. 4 is used as the off duty ratio $D_{OM}$ for the second solenoid valve 8.

Control goes to the step S56 when the driving condition is in the feedback range. In this case, feedback control according to a C-e control process is effected. The details of the C-e control process in the step S56 will be described with reference to FIGS. 6 through 11.

Figure 6:
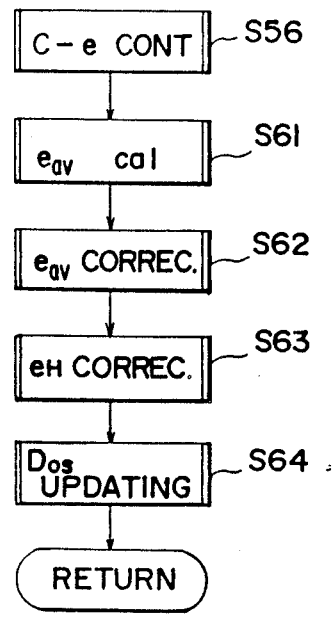

As shown in FIG. 6, the C-e control process comprises an average speed ratio calculating routine "$e_{av}$ cal" (step S61) for calculating the average value of ratios e of the rotational speeds of the input and output members of the lockup clutch in each average calculating time period $T_{CR}$, an $e_{av}$ correcting routine (step S62) for correcting the duty ratio to bring the speed ratio e into a target speed ratio range (extending from $e_L$ to $e_H$ and corresponding to a predetermined reference range as recited in the claims) based on the difference between the calculated average speed ratio $e_{av}$ and the target speed ratio range, an $e_H$ correcting routine (step S63) for correcting the duty ratio on a real-time basis to bring the speed ratio e back into the target speed ratio range when the speed-ratio e exceeds the upper limit $e_H$ of the range for a predetermined period of time $T_{eH}$ or more, and a $D_{OS}$ updating routine (step S64) for updating, as required, the latest value of the duty ratio obtained by the above routines and storing the updated duty ratio value as the learned value $D_{OS}$.

Prior to describing the above routines (steps S61 through 64), this control process will briefly be described with reference to FIG. 7 which shows how the speed ratio e varies according to the control process.

Figure 7:
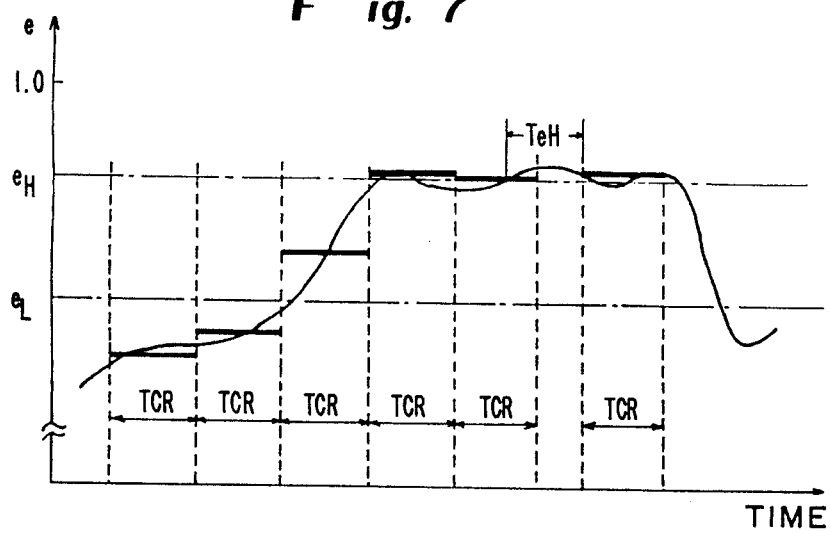
FIG. 7 is a graph showing speed ratios of the lockup clutch plotted against time.

The graph of FIG. 7 has a vertical axis indicating speed ratios e and a horizontal axis indicating time. The solid-line curve in the graph represents how the speed ratio e actually varies. The target speed ratio range lies between the lower speed ratio limit $e_L$ (e.g., $e_L$=0.95) indicated by the dot-and-dash line and the upper speed ratio limit $e_H$ (e.g., $e_H$=0.98) indicated by the dot-and-dash line. In the step S62, the speed ratio e is controlled so as to be in the target speed ratio range based on the difference between the average speed ratio $e_{av}$ (indicated by thicker lines) calculated in each average calculating time interval $T_{CR}$ and the target speed ratio range.

If the actual speed ratio e exceeds the upper speed ratio limit $e_H$ during the control step S62, the speed ratio e becomes very close to 1.0 (full lockup condition) and easily becomes 1.0. If the speed ratio e become 1.0 and the clutch is fully locked up, then insofar as the driving condition is in the feedback range B, engine vibrations are transmitted to the driving system and the automobile body, thereby producing noise. To avoid this, it is desirable to reliably prevent the lockup clutch from being fully locked up. To this end, if the speed ratio e exceeds the upper limit $e_H$ for the predetermined period of time $T_{eH}$ or more, the above control routine based on the average speed ratio $e_{av}$ is not effected, but the duty ratio is controlled to keep the speed ratio e in the target range on a real-time basis based on the speed ratio e at the time (step S63).

The duty ratio corrected based on the average speed ratio $e_{av}$ in the above control step is updated each time so that its value becomes appropriate and stored as the learned value $D_{OS}$ (step S64).

Figure 8:
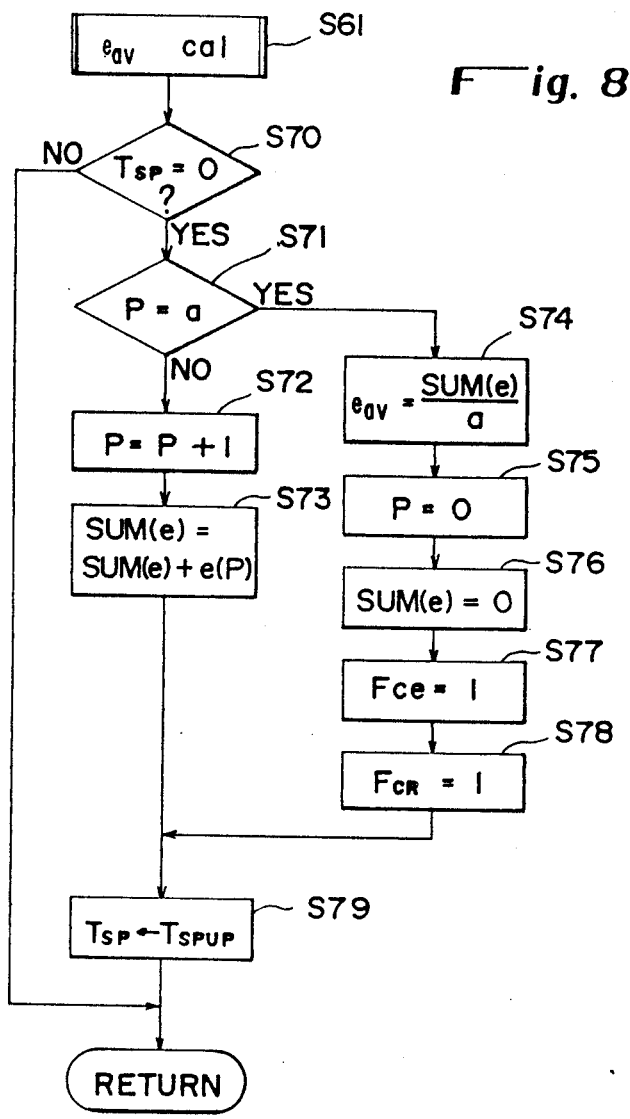

The routine of the step S61 is shown in FIG. 8. A step S70 first determines whether the value of a sampling timer $T_{SP}$ becomes 0 or not. If it becomes 0, then control goes to a step S71 to determine whether the value of a sampling counter P becomes a sampling number a. The sampling timer $T_{SP}$ indicates a periodic interval for detecting the speed ratio. The speed ratio is detected a times at the periodic interval, and the detected speed ratios are averaged to calculate the average speed ratio $e_{av}$. The average calculating time interval $T_{CR}=T_{SP}\times a$.

Until the value of the sampling counter P reaches a, control goes to a step S72 to increment the value of the sampling counter P by 1 at each periodic interval of the sampling timer $T_{SP}$, and a presently detected speed ratio e(P) is added to the previous speed ratio integral e to find a present speed ratio integral SUM(e) in a step S73. In this manner, from P=0 to P=(a−1), i.e., during $T_{CR}$, the sum of speed ratios e(P) detected a times, i.e., the integral SUM(e) of the speed ratios e in the average calculating time interval $T_{CR}$ is determined in each average calculating time interval $T_{CR}$.

At a time when P=a, control proceeds from the step S71 to a step S74 in which the speed ratio integral SUM(e) determined as described above is divided by the sampling number a to calculate the average speed ratio $e_{av}$ in the present average calculating time interval $T_{CR}$. Thereafter, the sampling counter P is set to 0 in a step S75, and the speed ratio integral SUM(e) is set to 0 in a step S76 in order to calculate the average speed ratio in a next average calculating time interval $T_{CR}$.

Then, dependent on the calculation of the average speed ratio ezv, a correction timing flag $F_{ce}$ and a correction permission flag $F_{CR}$ are set to 1 in steps S77 and S78, respectively.

Figure 9:
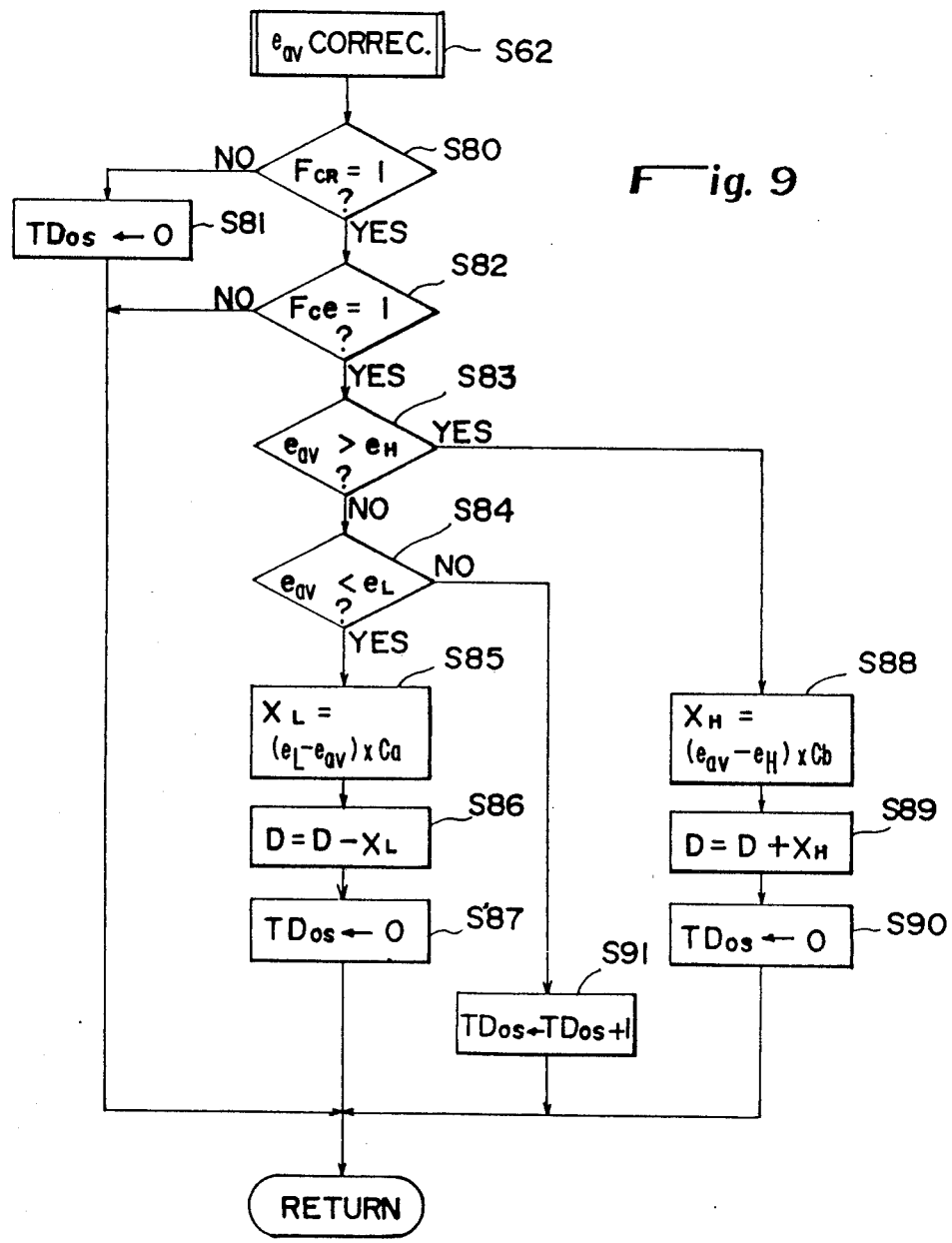

The $e_{av}$ correcting routine (step S62) for correcting the duty ratio by using the average speed ratio $e_{av}$ thus determined will be described with reference to the flowchart of FIG. 9.

In this flow, a step S80 determines whether the correction permission flag $F_{CR}$ is 1 or not. If it is 0, then a learned value updating timer $TD_{OS}$ is set to 0 in a step S81. Then a step S82 determines whether the correction timing flag $F_{ce}$ is 1 or not. If it is 0, then the flow of FIG. 9 goes to the return step.

If the correction timing flag $F_{ce}$ is 1, then a step S83 determines whether the average speed ratio $e_{av}$ is greater than the upper speed ratio limit $e_H$ shown in FIG. 7 or not. If $e_{av} > e_H$, then control proceeds to a step S88. In the step S88, a less intensive correcting value $X_H$ is determined by multiplying the difference between average speed ratio $e_{av}$ and the upper speed ratio $e_H$ by a predetermined coefficient Cb. The less intensive correcting value $X_H$ is added to the previous off duty ratio D used for controlling the operation of the second solenoid valve 8 to obtain a new off duty ratio D, which is stored as a controlling duty ratio during the present average calculating time interval $T_{CR}$ in a step S89. Thus, the amount of engagement of the lockup clutch is reduced by an amount corresponding to the less intensive correcting value $X_H$, reducing the speed ratio which has become larger than the upper speed ratio limit $e_H$ into the target speed ratio range. Then, the learned value updating timer $TD_{OS}$ is set to 0 in a step S90, after which the flow is completed.

If $e_{av} < = e_H$ in the step S83, then control goes to a step S84 which determines whether $e_{av} < e_L$. If $e_{av} < e_L$, then control goes to a step S85. In the step S85, a more intensive correcting value $X_L$ is determined by multiplying the difference between average speed ratio $e_{av}$ and the lower speed ratio $e_L$ by a predetermined coefficient Ca. The more intensive correcting value $X_L$ is substracted from the previous off duty ratio D used for controlling the operation of the second solenoid valve 8 to obtain a new off duty ratio D, which is stored as a controlling duty ratio during the present average calculating time interval $T_{CR}$ in a step S86. Thus, the amount of engagement of the lockup clutch is increased by an amount corresponding to the more intensive correcting value $X_L$, increasing the speed ratio which has become smaller than the lower speed ratio limit $e_L$ into the target speed ratio range. Then, the learned value updating timer $D_{OS}$ is set to 0 in a step S87, after which the flow is completed.

If $e_{av} > e_L$ in the step S84, then since the average speed ratio $e_{av}$ is in the target speed ratio range, control goes to a step S91 in which the value of the learned value updating timer $TD_{OS}$ is incremented by 1, and then the flow goes to the return step.

Figure 10:
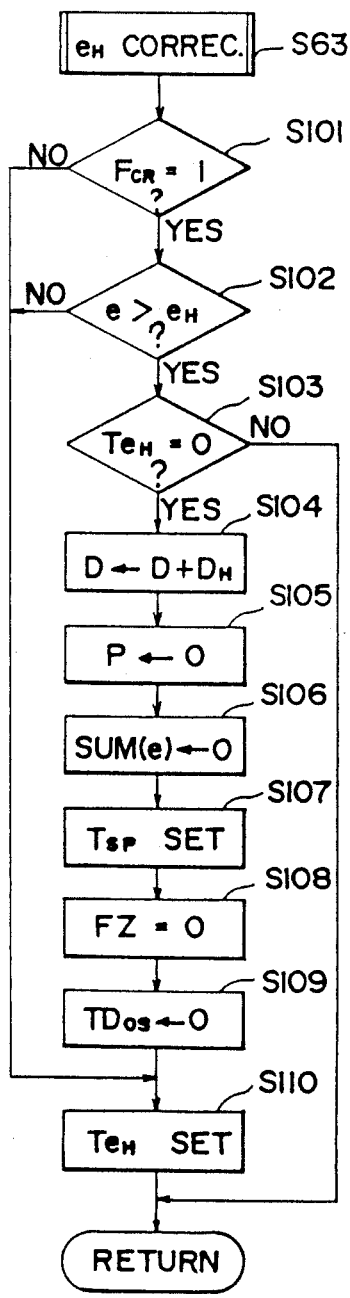

The $e_H$ correcting routine in the step S63 shown in FIG. 6 will be described with reference to the flowchart of FIG. 10.

First, a step S101 determines whether the correction permission flag $F_{CR}$ is 1 or not. If it is 0, then control jumps to a step S110 in which an $e_H$ correction determining time $T_{eH}$ is set to an initial value. If $F_{CR}=1$, then a step 102 determines whether the actual speed ratio e at the time is higher than the upper speed ratio limit $e_H$ or not. If $e < = e_H$, then control jumps to the step S110 in which the $e_H$ correction determining time $T_{eH}$ is set to the initial value.

If $e > e_H$, then a step S103 determines whether the $e_H$ correction determining time $T_{eH}$ is zero or over. If it is over, then it means that the condition $e > e_H$ has continued for the $e_H$ correction determining time (prescribed time) $T_{eH}$ or longer. If so, control steps following a step S104 are carried out. If the time $T_{eH}$ is not over, the flow goes to the return step.

In the step S104, in order to reduce the amount of engagement of the lockup clutch to lower the speed ratio e below the upper speed ratio limit $e_H$, the off duty ratio D for the second solenoid valve 8 is corrected by adding a prescribed corrective amount $D_H$ thereto. Thereafter, in steps S105 and S106, the values of the sampling counter P and the speed ratio integral SOM(e) are set to 0. Then, the sampling timer $T_{SP}$ is set in a step S107. The $Z_{ON}$ control permission flag FZ is set to 0 in a step S108, and the upper limit $e_H$ is immediately corrected without carrying out the $Z_{ON}$ control. In a step S109, the learned value updating timer $TD_{OS}$ is set to 0. Subsequently, the $e_H$ correction determining time $T_{eH}$ is set to the initial value in the step S110, after which the flow is finished.

Figure 11:
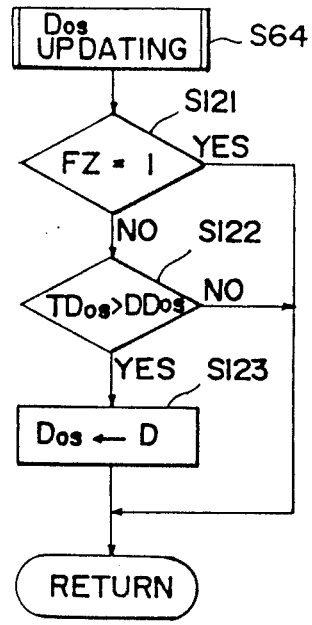

The $D_{OS}$ updating routine in the step S64 of FIG. 6 is illustrated in the flowchart of FIG. 11. First, a step S121 determines whether the $Z_{ON}$ control permission flag FZ is 1 or not, and then a step S122 determines whether the value of the learned value updating timer $TD_{OS}$ is greater than a updating determining time $DD_{OS}$ or not. If the $Z_{ON}$ control is not effected, and the speed ratio e is in the target speed ratio range for the updating determining time $DD_{OS}$ or more, the off duty ratio D at this time is stored as the learned value $D_{OS}$ in a step S123. Therefore, the off duty ratio $D_{OM}$ stored in the step S12 shown in FIG. 4 is the latest learned value $D_{OS}$ and is the most appropriate value at the time for maintaining the speed ratio e in the target speed ratio range.

The duty ratio for the second solenoid valve 8 is determined according to the aforesaid control process. Since this duty ratio is controlled so that the speed ratio e will be in the predetermined reference range, when an engine torque component is varied, the amount of engagement of the lockup clutch is varied dependent on the varying engine torque component to bring the speed ratio e into the reference range. Therefore, the duty ratio which is determined as described above is of a value containing a component corresponding to the engine torque. The duty ratio required to obtain a speed ratio during running on a sloping road differs from the duty ratio required to obtain the same speed ratio during running on a flat road.

In view of this, according to the control process of the present invention, the component corresponding to the engine torque (referred to as the engine torque component) is removed from the duty ratio determined as described above, and the amount of engagement of the lockup clutch is estimated and set based on the remaining component (referred to as the feedback component).

Figure 12:
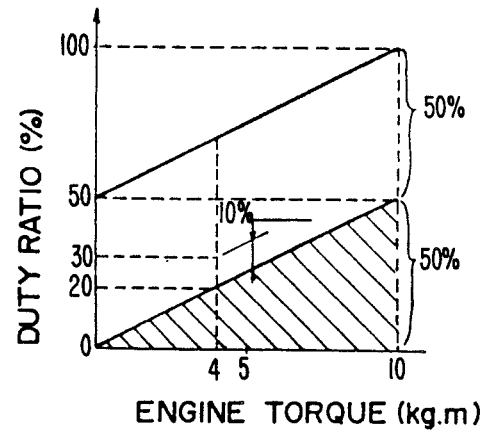
FIG. 12 is a graph illustrating the relationship between duty ratios of the solenoid valves and the engine torques.

This will be described in detail with reference to FIG. 12. It is assumed that a duty ratio is to be set when the automobile is normally running at 50 km/h, for example. If the engine torque at this time is 4 kg-m and the learned value of the feedback component is 20% as seen from FIG. 12, and the feedback component is $50 \times (20/100) = 10\%$. The on duty ratio for the second solenoid valve 8 is the sum of both components, i.e., 30%. When the driving condition is in the first semitight range, a value produced by adding a fixed value to the above learned value is used as the feedback component.

The control variables for the solenoid valves in the ranges are summarized in the table of FIG. 13. When the driving condition is in the off range, the first solenoid valve 7 and the timing valve 40 are turned off, and so is the second solenoid valve 8. That is, the on duty ratio of the second solenoid valve is 0%. When the driving condition is in the feedback range, the first solenoid valve 7 is turned on and the second solenoid valve 8 is controlled by the duty ratio which is established by the sum of the feedback component determined based on the feedback control and the engine torque component determined dependent on the engine torque at the time. In the control range, the latest learned value stored in the feedback control serves as the feedback component, and the second solenoid valve 8 is controlled by the duty ratio established by the sum of this feedback component and the engine torque component corresponding to the engine torque. In the first semitight range, the second solenoid valve 8 is controlled by the duty ratio which is established by the sum of the feedback component produced by adding a fixed value to the latest learned value to increase the amount of engagement of the lockup clutch, and the engine torque component. In the second semitight range, the first and second solenoid valves 7, 8 are turned on, and the timing valve 40 is turned off. In the tight range, the first solenoid valve 7 is turned off, and the timing valve 40 is turned on.

In the above embodiment, the ratio of the rotational speeds of the input and output members of the lockup clutch is employed in determining the duty ratio for controlling the second solenoid valve 8. However, the difference between the rotational speeds of the input and output member may be used instead of the speed ratio.

While the torque converter is illustrated as the hydrodynamic driving apparatus in the aforesaid embodiment, another hydrodynamic driving apparatus such as a fluid coupling or the like, for example, may be employed.

According to the embodiments, as described above, a parameter (e.g., the ratio of the rotational speeds of the input and output members) indicative of the amount of a slippage between the input and output members is measured in each prescribed time interval, and the average of the measured values of the parameter is determined in each time interval. A control value for the amount of engagement of the lockup clutch or direct coupling mechanism in a next time interval is determined based on the difference between the average value and the predetermined reference range value. Since the control value for the amount of engagement of the direct coupling mechanism is kept at a fixed level for the time interval, the rotational speeds of the input and output members of the torque converter are prevented from being surged or varied. As feedback control is effected based on the average of the parameters in the prescribed time interval, the automobile is prevented from running in an embarrassing situation in which it would be accelerated while the engine rotational speed is being lowered.

The control apparatus of the present invention employs, as control oil pressures, the constant oil pressure supplied dependent on the turning on and off of the first solenoid valve and the duty-ratio-controlled oil pressure supplied dependent on the duty ratio control of the second solenoid valve, for controlling the operation of the lockup shift valve, the lockup control valve, and the lockup timing valve to engage and disengage the lockup clutch and control the amount of engagement of the lockup clutch. The lockup clutch can be stably controlled without using the throttle pressure which tends to become unstable as when gear shifts are effected.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A method of controlling a direct coupling mechanism disposed between input and output members of a hydrodynamic driving apparatus to mechanically connect or disconnect the input and output members, wherein engagement of the direct coupling mechanism is controlled so that a parameter indicative of slippage between said input and output members falls in a predetermined fixed reference range, said method comprising the steps of:

determining an average value of said parameter which is measured in a prescribed time interval;
   determining a control value for said engagement in a next prescribed time interval based on a difference between said average value and said predetermined reference range value; and controlling engagement of said direct coupling mechanism based on said control value in said next time interval.

2. A method according to claim 1, wherein the area of a map determined based on the output power of an engine coupled to said input member and the speed of said output member is divided into an off range, a feedback range, a control range, a semitight range, and a tight range, said method further including the step of:

controlling said amount of engagement to keep said parameter in said predetermined reference range when a driving condition determined by said output power of the engine and said speed of the output member is in said feedback range.

3. A method of controlling a direct coupling mechanism disposed between input and output members of a hydrodynamic driving apparatus to mechanically connect or disconnect the input and output members, so that the amount of engagement of the direct coupling mechanism is controlled so as to bring a parameter indicative of the amount of slippage between said input and output members into a predetermined reference range, said method comprising the steps of:

determining the average value of said parameter which is measured in a prescribed time interval;
   determining a control value for said amount of engagement in a next prescribed time interval based on the difference between said average value and said predetermined reference range value;
   wherein the area of a map determined based on the output power of an engine coupled to said input member and the speed of said output member is divided into an off range, a feedback range, a control range, a semitight range, and a tight range;
   controlling said amount of engagement to keep said parameter in said predetermined reference range when a driving condition determined by said output power of the engine and said speed of the output member is in said feedback range;

storing as a learned value a control value employed in correcting said amount of engagement when said driving condition is in said feedback range; and controlling said amount of engagement by employing said stored latest learned value when said driving condition is in said control range or said semitight range.

4. A method according to any one of claims 1 through 3, wherein said hydrodynamic driving apparatus comprises a torque converter having an impeller as said input member and a turbine as said output member, and said direct coupling mechanism comprises a lockup clutch for selectively connecting and disconnecting said impeller and said turbine.

5. A method according to claim 4, wherein a speed ratio "e" of said impeller to said turbine represents said parameter.

6. A method according to claim 5, wherein said predetermined fixed reference range corresponds to a range of said speed ratio between a lower speed ratio limit "$e_L$" and an upper speed ratio limit "$e_H$".

7. A method according to claim 6, wherein said lower speed ratio limit "$e_L$" is 0.95 and said upper speed ratio limit "$e_H$" is 0.98.

8. An apparatus for controlling a direct coupling mechanism disposed between input and output members of a hydrodynamic driving apparatus to mechanically connect or disconnect the input and output members, and said apparatus comprising:

a shift valve for selectively engaging and disengaging said direct coupling mechanism;

a control valve for controlling the amount of engagement of said direct coupling mechanism;

a timing valve for keeping said direct coupling mechanism in a fully engaged condition;

a first solenoid valve which can be selectively turned on and off;

a second solenoid valve which can be controlled in duty ratio;

said shift valve, said control valve, and said timing valve being controllable in operation solely by a constant oil pressure supplied dependent on the turning on and off of said first solenoid valve and a duty-ratio-controlled oil pressure supplied dependent on the duty ratio control of said second solenoid valve;

said direct coupling mechanism being operable selectively into a disengaged condition by supplying an oil pressure to a release passage thereof, a partly engaged condition by supplying a control oil pressure corresponding to said duty-ratio-controlled oil pressure to said release passage, and a fully engaged condition by cutting off the supply of the oil pressure to said release passage.

9. An apparatus according to claim 8, wherein the area of a map determined based on the output power of an engine coupled to said input member and the speed of said output member is divided into an off range, a feedback range, a control range, semitight range, and tight range, said direct coupling mechanism being operable into said disengaged condition when a driving condition determined by said output power of the engine and said speed of the output member is in said off range, into said partly engaged condition when said driving condition is in said feedback range, said control range, or said semitight range, and into said fully engaged condition when said driving condition is in said tight range.

10. An apparatus according to claim 8 or 9, wherein said hydrodynamic driving apparatus comprises a torque converter having an impeller as said input member and a turbine as said output member, and said direct coupling mechanism comprises a lockup clutch for selectively connecting and disconnecting said impeller and said turbine.

11. A method of controlling the amount of engagement of a direct coupling mechanism disposed between input and output members of a hydrodynamic driving apparatus in a motor vehicle to mechanically connect and disconnect the input and output members, said method comprising the steps of:

establishing, depending on a driving condition of the motor vehicle, an off range in which the direct coupling mechanism is disengaged, a feedback range in which said amount of engagement is controlled under feedback control to keep a parameter indicating the amount of slippage between the input and output members within a predetermined reference range, a semitight range in which said amount of engagement is controlled to engage the direct coupling mechanism while the motor vehicle is running normally and to cause the direct coupling mechanism to slip while the motor vehicle is being accelerated, and an on range in which the direct coupling mechanism is fully engaged; and determining a control value for the amount of engagement of the direct coupling mechanism in said semitight range based on a control value for the amount of engagement when said parameter is kept within said predetermined reference range in said feedback range.

* * * * *